United States Patent
Löbbert et al.

(10) Patent No.: US 11,536,661 B2
(45) Date of Patent: Dec. 27, 2022

(54) OPTOCHEMICAL SENSOR AND METHOD

(71) Applicant: Endress+Hauser Conducta GmbH+Co. KG, Gerlingen (DE)

(72) Inventors: Andreas Löbbert, Waldheim (DE); Alexander Hörig, Geringswalde (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 50 days.

(21) Appl. No.: 16/993,823

(22) Filed: Aug. 14, 2020

(65) Prior Publication Data
US 2021/0048390 A1    Feb. 18, 2021

(30) Foreign Application Priority Data

Aug. 16, 2019  (DE) ...................... 10 2019 122 096.3

(51) Int. Cl.
*G01N 21/64* (2006.01)
*G01N 21/77* (2006.01)

(52) U.S. Cl.
CPC ....... *G01N 21/6428* (2013.01); *G01N 21/643* (2013.01); *G01N 21/648* (2013.01); *G01N 21/7703* (2013.01); *G01N 2021/6434* (2013.01); *G01N 2021/6439* (2013.01)

(58) Field of Classification Search
None
See application file for complete search history.

(56) References Cited

U.S. PATENT DOCUMENTS

| 4,399,099 A | * | 8/1983 | Buckles | ............. G01N 33/5302 |
| | | | | 422/401 |
| 4,892,383 A | * | 1/1990 | Klainer | ............. G01N 21/7703 |
| | | | | 385/12 |
| 5,532,493 A | * | 7/1996 | Hale | .................... G01N 21/648 |
| | | | | 250/458.1 |
| 5,652,810 A | | 7/1997 | Tipton et al. | |

(Continued)

FOREIGN PATENT DOCUMENTS

| DE | 2654726 B1 | 3/1978 |
| DE | 19524207 A1 | 6/1996 |

(Continued)

*Primary Examiner* — Neil N Turk
(74) *Attorney, Agent, or Firm* — Christopher R. Powers; Endress+Hauser (USA) Holding, Inc.

(57) ABSTRACT

The present disclosure discloses an optochemical sensor for determining a measurand correlating with a concentration of an analyte in a measuring fluid, comprising: a housing having an immersion region configured for immersing in the measuring fluid; a removable cap having a sensor spot, the removable cap removably arranged at the immersion region of the housing, wherein the sensor spot is disposed on a circumferential face; a radiation source disposed in the housing for radiating excitation radiation into the removable cap, wherein a deflection module is disposed in the removable cap as to deflect excitation radiation radiated into the removable cap; a radiation receiver disposed in the housing for receiving received radiation emitted by the sensor spot; and a sensor circuit disposed in the housing and configured to control the radiation source, receive signals of the radiation receiver, and generate output signals based on the signals of the radiation receiver.

15 Claims, 3 Drawing Sheets

(56) References Cited

U.S. PATENT DOCUMENTS

| | | | | |
|---|---|---|---|---|
| 6,139,797 A | * | 10/2000 | Suzuki | G01N 21/553 356/445 |
| 2004/0173738 A1 | * | 9/2004 | Mizuno | G02B 26/0841 250/234 |
| 2010/0203649 A1 | | 8/2010 | Thrier | |
| 2011/0046491 A1 | | 2/2011 | Diamond | |

FOREIGN PATENT DOCUMENTS

| | | |
|---|---|---|
| DE | 19856591 A1 | 6/2000 |
| DE | 10241833 A1 | 3/2004 |
| DE | 60111531 T2 | 5/2006 |
| EP | 0372802 A2 | 6/1990 |
| EP | 2295953 A1 | 3/2011 |
| FR | 2785681 A1 | 5/2000 |

\* cited by examiner

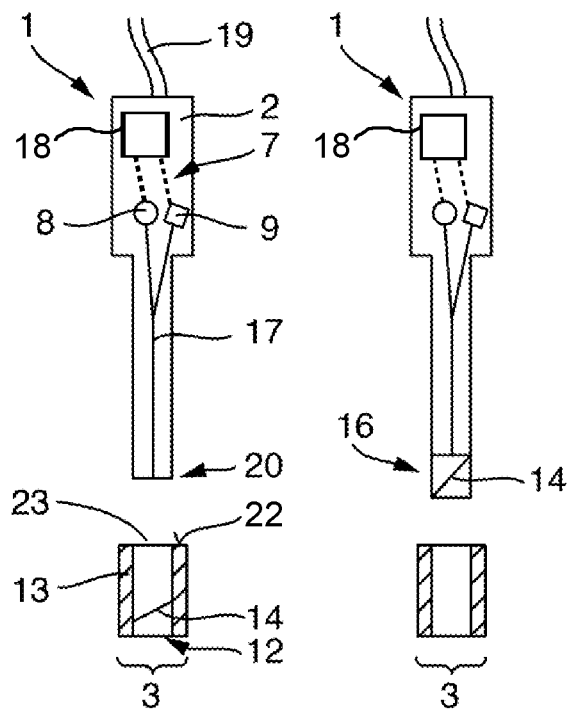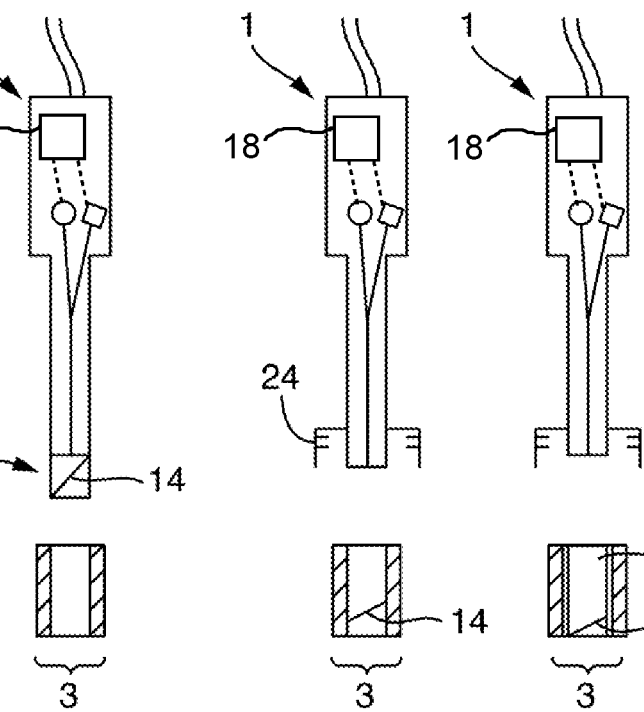

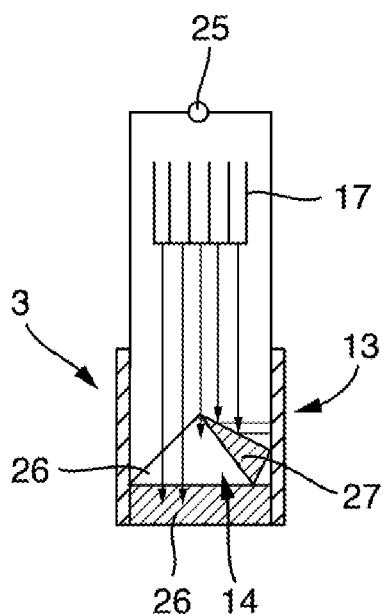 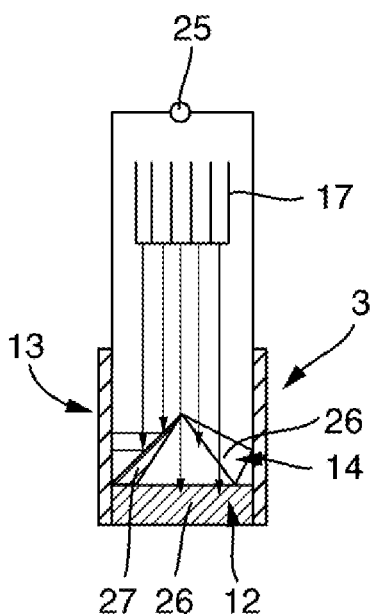
Fig. 7a   Fig. 7b
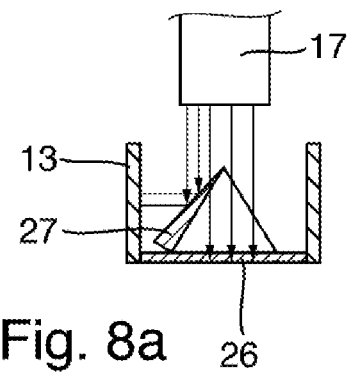 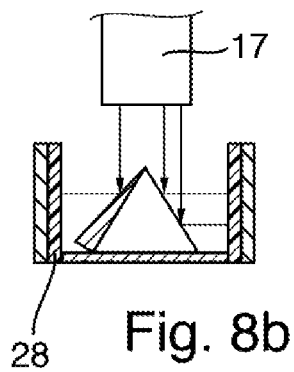 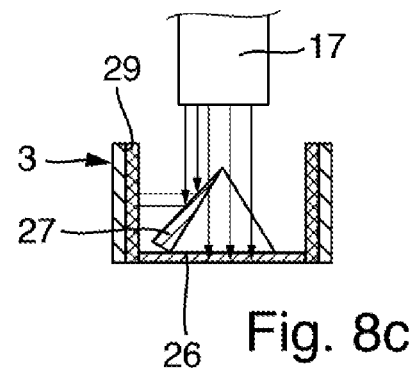
Fig. 8a   Fig. 8b   Fig. 8c
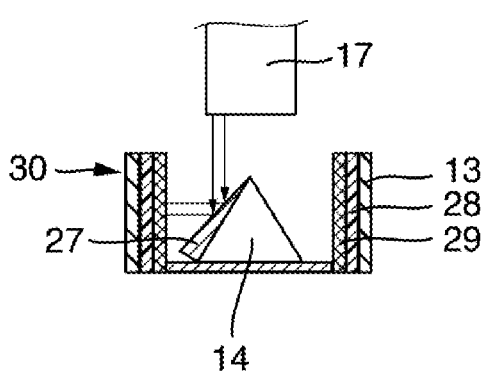
Fig. 8d
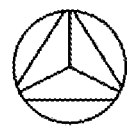 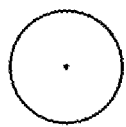
Fig. 9a   Fig. 9b
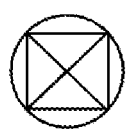 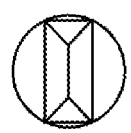
Fig. 9c   Fig. 9d

OPTOCHEMICAL SENSOR AND METHOD

CROSS-REFERENCE TO RELATED APPLICATION

The present application is related to and claims the priority benefit of German Patent Application No. 10 2019 122 096.3, filed on Aug. 16, 2019, the entire contents of which are incorporated herein by reference.

TECHNICAL FIELD

The invention relates to an optochemical sensor and a method for changing the measurand correlating with a concentration of an analyte in a measuring fluid with such an optochemical sensor.

BACKGROUND

Such a sensor includes, for instance, a sensor head which contains an optical sensor element and which is connected to a housing which contains a data processing unit, wherein the optical sensor element is irradiated with light by a light source. The light is reflected by the optical sensor element in a specific light characteristic, possibly after conversion, is detected by a light receiver, and a signal of the light receiver representative of the light characteristic is evaluated by the data processing unit. The "optical sensor element" is often also referred to as a sensor spot or as a sensor membrane according to its type.

EP 2 295 953 A1 discloses an apparatus for measuring substance concentrations in solutions based on a fluorescence measurement. The apparatus comprises a light source which emits a transmitted light into a medium to be examined. An optical sensor element, which is arranged in contact with the medium to be examined, is excited by this transmitted light. In fluorescence measurement, the transmitted light is absorbed by the optical sensor element and light of a different wavelength and intensity is reflected as a function of the process variable, that is to say, for instance, the concentration of an analyte. The radiation reflected back by the optical sensor element is received by a light receiver as received light, converted into an electrical measurand and forwarded to a data processing unit. Depending on the properties of the optical sensor element and the transmitted light, the optical sensor reacts to different particle concentrations with different received light intensities, reception frequencies, phase angles and/or decay curves.

An exemplary sensor is, for instance, the digital oxygen sensor "Memosens COS81D" manufactured by the Applicant.

In principle, various methods exist for arranging the light source/the light receiver opposite the sensor spot.

In the case of sensors with an adequate energy supply, the light source/the light receiver can be arranged directly on the optical sensor element. However, this is difficult to realize with high-temperature sensors since this arrangement results in long and interference-prone connecting lines from the data processing unit arranged remote from the high-temperature measuring point to the optical components.

In order to avoid this, the light source and the light receiver can be placed far away from the possibly hot medium to be examined. The light can then be directed via a light guide to the optical sensor element.

Usually, precisely one sensor spot is located in a generic sensor. If another parameter is to be measured, another sensor must be used.

SUMMARY

The object of the present disclosure is to propose a multi-parameter sensor which is simple to manufacture and handle.

The object is achieved by an optochemical sensor, comprising: a housing, especially, a cylindrical housing, which has at least one immersion region designed for immersing into the measuring fluid; a removable cap, especially, a cylindrical removable cap, with at least one sensor spot, wherein the removable cap is removably arranged at the immersion region of the housing, wherein the sensor spot is arranged on the circumferential face; a radiation source arranged in the housing for radiating excitation radiation into the removable cap, wherein a deflection module is arranged in the removable cap and deflects, in the direction of the sensor spots, excitation radiation radiated into the removable cap on the front side; a radiation receiver arranged in the housing for receiving received radiation which is emitted by the sensor spot; and a sensor circuit which is arranged in the housing and designed to control the radiation source, receive signals of the radiation receiver and generate and output output signals based on the signals of the radiation receiver.

This sensor results in a simple possibility of enabling a plurality of parameters with only one single sensor. Excitation radiation can be directed onto various regions of the circumferential face by the deflection module, especially, if a plurality of sensor spots is used.

In one embodiment, it is provided that the deflection module deflects the excitation light at an angle of 90°, see also below.

This results in a further advantage, which can also be seen when only a single sensor spot is used. The fact that the spot is no longer placed on the underside as in the prior art but away from it results in a bubble-repellent analyte measurement. A measurement is thus also possible in measuring media with a tendency toward gas bubbles since no bubbles remain laterally on the vessel wall and rise upward. The measuring window, i.e., the sensor spot, is free of bubbles. In the simplest case, the measurement is suitable for measuring a single measurement parameter (e.g., oxygen).

In one embodiment, it is provided that the deflection module comprises a mirror, a prism or a beveled glass rod. In general, the deflection module is an optical component which can change the light path.

In one embodiment, it is provided that at least the region of the circumferential face on which the sensor sport is arranged is omniphobic, hydrophobic, superhydrophobic, hydrophilic or superhydrophilic.

In the assembled state, the deflection module is, as claimed, always located in the removable cap. There are various possibilities in this respect.

In one embodiment, it is provided that the deflection module is arranged directly in the removable cap.

In one embodiment, it is provided that the deflection module is arranged in the removable cap on the front side, for instance in the base. In one embodiment, this is a mirror with an inclination of 45° to the perpendicular of the cap.

In one embodiment, it is provided that the deflection module is rotated by rotating the base by means of a thread and the beam-deflecting face thus changes the direction of the excitation radiation.

In one embodiment, it is provided that the deflection module is arranged in an adapter.

In one embodiment, it is provided that the adapter is designed as an inlay for the removable cap. The adapter is thus an adapter for the removable cap.

In one embodiment, it is provided that the sensor comprises a light guide which conducts excitation radiation from the radiation source in the direction of the removable cap, wherein the adapter is designed to be adaptable to the light guide. In this embodiment, the adapter is thus an adapter for the light guide.

In one embodiment, it is provided that the region of the circumferential face with the sensor spot is designed to be translucent or transparent at least for the excitation radiation and received radiation.

In one embodiment, it is provided that the deflection module deflects the excitation radiation by 90°. In one embodiment, the deflection module is designed as a mirror or prism with a side face of 45° to the perpendicular.

In one embodiment, it is provided that the removable cap consists of a gas ceramic, glass, borosilicate glass, quartz glass, sapphire, a transparent or translucent plastic of the series polycarbonate, cyclic olefin copolymer (e.g., TOPAS®) polysulfones, poly(n-methyl methacrylimide), ethylene norbornene copolymers or a hybrid of stainless steel and these materials.

In one embodiment, it is provided that the removable cap comprises at least two sensor spots.

In one embodiment, it is provided that the sensor comprises orientation means assigned to at least one sensor spot, wherein the orientation means are designed to enable a set orientation of the sensor spot on the sensor.

In one embodiment, it is provided that the orientation means comprise a tongue-and-groove connection. This enables an unambiguous mounting, whereby an alignment of the excitation radiation at defined angles is ensured.

In one embodiment, it is provided that the housing comprises a thread and the removable cap comprises a corresponding counter-thread.

In one embodiment, it is provided that the deflection module is rotated from above, i.e., from the side facing away from the medium. In this case, a rotation takes place from the side of the sensor head. Either a detent can be released in this case, whereby the rotational movement of the deflection module is then possible or the sensor is freely rotatably movable in a cap receptacle. The movement of the parts can also occur in an automated manner, for example, hydraulically driven by a fitting.

In one embodiment, it is provided that the deflection module can be activated by external excitation.

In one embodiment, it is provided that the deflection module can be activated by a voltage, a current, a light entry, a magnetic field, a temperature, a specific gas concentration or a combination thereof.

As mentioned, the deflection module is located as being arranged directly in the cap, as an adapter in the cap or as an adapter for the light guide. The activatable deflection module conducts excitation radiation by switching individual regions of the deflection module from transparent to reflective or from reflective to transparent to the side face of the cap, whereby different measurement parameters can be measured in a slightly time-shifted manner by the switchable activation.

In one embodiment, it is provided that the deflection module is designed as a polyhedron or cone.

In one embodiment, it is provided that the deflection module is superposed by a switchable layer which, depending on the switching position, is impermeable to radiation or optically transparent.

In one embodiment, it is provided that the deflection module is superposed by a switchable layer which, depending on the switching position, is designed to be reflective or transparent to the excitation radiation.

In one embodiment, it is provided that the sensor spot comprises a carrier which is coated on the rear side and which consists of a switchable film, wherein the latter is arranged, especially welded, especially onto a removable cap made of plastic, such as polycarbonate, and lets through or absorbs the excitation radiation.

In one embodiment, it is provided that the inner face of the removable cap comprises a switchable layer and a reflective layer of the deflection module is switchable.

In one embodiment, it is provided that the front side of the removable cap is impermeable to the excitation radiation.

In one embodiment, it is thus provided that the cap contains one at least one switchable specular layer and/or one switchable transparent layer.

In one embodiment, it is provided that the deflection module comprises a mirror which can be activated from reflective to transparent or wherein the deflection module consisting of a specular polyhedron is superposed with a top face which can be switched from reflective to transparent.

The object is further achieved by a method for changing the measurand correlating with a concentration of an analyte in a measuring fluid with an optochemical sensor as described above, comprising the steps of: removing the removable cap from the housing; rotating the removable cap; and reattaching the removable cap to the housing.

The object is further achieved by a method for changing the measurand correlating with a concentration of an analyte in a measuring fluid with an optochemical sensor as described above, comprising the steps of: rotating the bottom of the removable cap.

The object is further achieved by a method for changing the measurand correlating with a concentration of an analyte in a measuring fluid with an optochemical sensor as described above, comprising the steps of: removing the removable cap from the housing; rotating an adapter in the removable cap; and reattaching the removable cap to the housing.

The object is further achieved by a method for changing the measurand correlating with a concentration of an analyte in a measuring fluid with an optochemical sensor as described above, comprising the steps of: removing the removable cap from the housing; rotating the adapter on the light guide; and reattaching the removable cap to the housing The object is further achieved by a method for changing the measurand correlating with a concentration of an analyte in a measuring fluid with an optochemical sensor as described above, wherein the removable cap comprises a thread, the method comprising at least the step of: rotating the removable cap or rotating the bottom of the removable cap.

BRIEF DESCRIPTION OF THE DRAWINGS

The present disclosure is explained in more detail with reference to the following figures:

FIG. 2 shows the claimed optochemical sensor in one embodiment;

FIG. 3 shows the claimed optochemical sensor in one embodiment;

FIG. 4 shows the claimed optochemical sensor in one embodiment;

FIG. 5 shows the claimed optochemical sensor in one embodiment;

FIGS. 6a-6e show the claimed optochemical with regard to the positioning of the removable cap;

FIGS. 7a and 7b show the claimed optochemical sensor in one embodiment with an activatable deflection module;

FIGS. 8a-8d show the claimed optochemical sensor in one embodiment with an activatable deflection module; and FIGS. 9a-9d show various geometries of the activatable deflection module.

Figure 1:
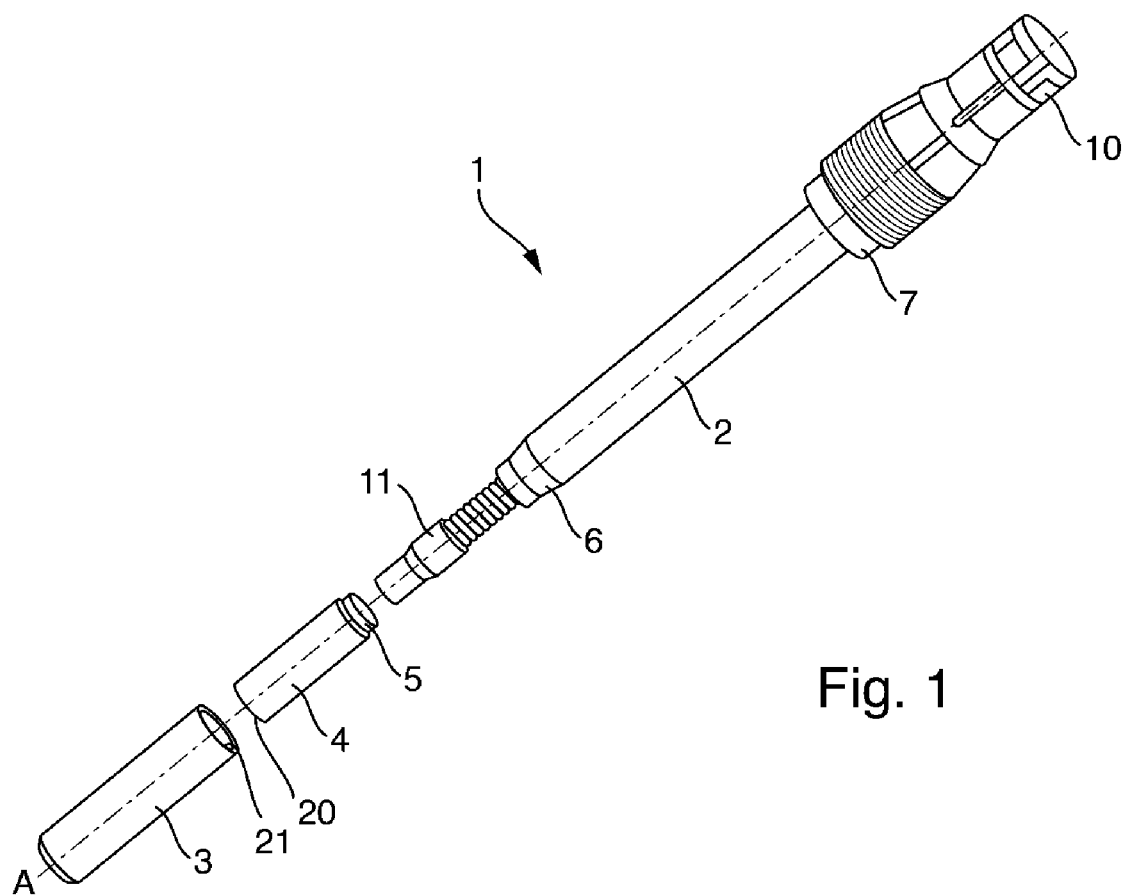
FIG. 1 shows a schematic exploded view of the claimed optochemical sensor.

In the figures, the same features are identified with the same reference signs.

DETAILED DESCRIPTION

Although the invention is explained further with reference to an oxygen sensor, the inventive idea is not intended to be limited to sensors which operate according to the principle of luminescence quenching. Rather, other process variables, for example, concentrations of certain analysts, such as ions, molecules, gases or other chemical compounds, pH value or temperature are also measurable by such an arrangement with conventional modifications. Measuring devices which are suitable for determining the corresponding process variables are offered and sold by the Endress+Hauser group of companies in a wide variety of variants.

FIG. 1 schematically depicts an optochemical sensor. In the present exemplary embodiment, sensor 1 is designed to determine a concentration of a gas dissolved in a measuring liquid, for example dissolved oxygen. The sensor 1 has a housing 2 which, in the exemplary embodiment shown here, has a substantially cylindrical design. The diameter is, for example, 12 mm or 40 mm. The housing 2 comprises a sensor membrane 13 (not shown in FIG. 1) intended for contact with a measuring medium. The sensor membrane 13 comprises, inter alia, a luminescent dye which is embedded in a polymer matrix and the luminescence of which is quenched by the analyte, for example oxygen here. Alternatively, the luminescent dye may also have the property that its luminescence is enhanced by the analyte. This is the case, for example, in optical pH detection with luminophores on the basis of the photoinduced electron transfer (PET) effect. The sensor membrane 3 can have a stabilizing substrate and a plurality of layers applied to the substrate; see below. The membrane 13 is also referred to as a sensor spot.

A radiation source 8 which can comprise one or more LEDs, for example, is arranged in the housing 2. Furthermore, a radiation receiver 9 which can comprise one or more photodiodes, for example, is arranged in the housing 2. Radiation source 8 and radiation receiver 9 are located in a receiving and transmitting unit 7. The housing 2 also contains a light guide 17 that conducts radiation emitted by the radiation source 8 to the sensor membrane 13 and conducts luminescence radiation emitted by the luminescent dye embedded in the sensor membrane 13 to the radiation receiver 9. The light guide 17 may comprise one or more optical fibers. For example, the light guide 17 is formed by a fiber bundle which has a first arm connecting the radiation source 8 to the sensor membrane 13 and which has a second arm connecting the radiation receiver 9 to the sensor membrane 13. The optical sensor 1 has a sleeve-shaped housing section as part of the sensor housing 2, which section is connected to the receiving and transmitting unit 7. The light guide 17 is guided within the housing section. One possible embodiment of the light guide 17 is the realization as a glass rod. The glass rod is correspondingly bent, drawn, etc. into shape. The two individual arms then combine to form a single glass rod.

The radiation source 8 and the radiation receiver 9 are electrically connected to a sensor circuit 18. The sensor circuit 18 is designed to excite and control the radiation source 8 to emit radiation. Furthermore, the sensor circuit 18 is designed to receive and process signals of the radiation receiver 9 which represent the luminescence radiation received by the radiation receiver 9. The processed signals serve as measurement signals of the sensor 1 and can be output by the sensor circuit 18 via an interface 10 to a superordinate unit, for example a measurement transmitter, a controller, a computer or an operating device. The interface 10 may be a cable connection fixedly connected to the sensor circuit 18, a detachable plug connection with galvanic contacts or else a galvanically separated, especially, inductively coupling, plug connection. Via the cable 19 connected to the interface 10, the sensor circuit 18 can be supplied with energy, also for operating the radiation source 8. Furthermore, the sensor circuit 18 can transmit signals, especially, data, to the superordinate unit via the cable 19 and, optionally, receive signals, especially, data, from the superordinate unit. The interface 10 is sold by the applicant under the name "Memosens."

The detection of measured values and the evaluation of the signals of the radiation receiver 8 for determining a measured value can be divided between the sensor circuit 18 and the superordinate unit. For example, the sensor circuit 18 itself can be designed to control the radiation source 8. For this purpose, it can comprise a microcontroller that executes a computer program which is stored in a memory of the sensor circuit 18 and serves to control the radiation source 8 in order to detect measured values. Alternatively, at least part of the functions of the control may also be carried out by the superordinate unit, which then sends corresponding control signals for actuating the radiation source 8 to the sensor circuit 18. Accordingly, in order to process the signals detected by the radiation receiver 8, the microcontroller can execute a computer program which is stored in a memory of the sensor circuit 18 and which serves to evaluate the signals in order to determine measured values. The correspondingly processed signals can be output as measurement signals representing the measured values to the superordinate unit via the interface 10.

The sleeve-shaped housing section is connected to an optical waveguide mount 4 and a first thread 5, which is connected to a second thread 6 at the end of the housing section 2.

A removable cap 3 is fitted onto the optical waveguide mount 4 or connected with a thread pair 20, 21. The removable cap 3 is substantially cylindrical and has the medium-contacting sensor membrane 13 already mentioned. The removable cap 3 has a housing shell 22 and a longitudinal axis which lies on the longitudinal axis A of the sensor 1.

The sensor membrane 13 has luminophore molecules that are embedded in a matrix material. In contact with the measuring liquid containing the analyte of a specific concentration, the analyte penetrates into the polymer matrix and interacts with the luminescent dye. If the luminescent dye is excited by radiation of the radiation source 8 to emit luminescence radiation, the luminescence is quenched as a function of the concentration of the analyte, for example in the case of oxygen detection in the polymer matrix. Conversely, an increase in the fluorescence or phosphorescence is however also possible (e.g., in the case of an optical pH measurement). The sensor circuit 18 detects by means of the radiation receiver 9 characteristic parameters, such as the luminescence intensity, the phase shift of the luminescence signal or also the decay time of the luminescence, and determines a measured value of the analyte concentration present in the measuring medium by comparison with a calibration function.

The measuring principle of the exemplary optical sensor 1 is thus based on the principle of luminescence quenching and is described in more detail below on the basis of the determination of a concentration of dissolved oxygen in the measuring medium. Nonetheless, the scope of the present disclosure is not limited to sensors which operate according to the principle of luminescence quenching. Rather, other process variables, for example, concentrations of certain analysts, such as ions, molecules, gases or other chemical compounds, pH value or temperature are also measurable by such an arrangement with modifications understood by those having ordinary skill in the art.

The concentration of oxygen molecules of the sensor membrane 13, thus also the partial pressure of oxygen, in this case corresponds to the concentration or partial pressure in the measuring medium. In the measurement process, a first light signal with at least one corresponding first wavelength is initially emitted to excite the luminophore molecules via the radiation source 8. If the light signal hits the luminophore molecules, the latter are excited and emit a second light signal. If oxygen molecules are present in the sensor membrane 13, they attach themselves to the luminophore molecules and influence the emission light signal (for example, different intensity, different phase angle, or different decay time). Thus, for example, energy is transmitted by collision of the oxygen molecule with the luminescent dye. The intensity and decay time of the emission light signal are thereby reduced. This effect is also referred to as "quenching," and the oxygen molecules are in this case what are known as "quenchers." The intensity of the emission light signal depends on the concentration of quencher molecules. Of course, not only oxygen molecules but also other molecules can be determined in this manner, depending on which luminophore is used. For example, concentration of nitrogen oxides, sulfur oxides, such as sulfur monoxide or sulfur dioxide, and ozone can be determined accordingly.

The sensor membrane 13 can be applied to a substrate or a carrier. The latter can be made of quartz, for example. The sensor membrane 13 can have, inter alia, a luminophore-containing layer, a light-protective layer, an adhesive layer or adhesion-promoting layer and a top layer. The top layer is in this case the layer in contact with the medium. Alternatively or additionally, however, a proton-conducting layer may also be provided. The layers may be arranged in a sandwich-like manner one above the other as described above. However, it is also possible for individual layers to be covered or even completely encapsulated by other layers, including on the edge side.

As an alternative to the luminescence sensor described, the sensor sport 13 comprises at least one layer which, upon contact with the process variable in the medium, changes at least one property, for example changes color, and absorbs transmission radiation as a function of the process variable.

The claimed sensor 1 is now described with reference to FIGS. 2-5. The sensor 1 comprises a deflection module 14. In various embodiments, the deflection module is realized by a mirror or a prism (FIGS. 2, 4, 5) or a beveled glass rod (FIG. 3). The deflection module 14 is arranged in the removable cap 3 (FIGS. 2, 4), in the removable cap 3 with adapter 15 (FIG. 5) or as an adapter 16 to the light guide 17 (FIG. 3) so that the light beam from the radiation source 8 hits the lateral face of the removable cap at an angle of 90°.

The removable cap 3 has the external dimensions of a conventional removable cap of the prior art but differs therefrom in that the lateral face or a part of the lateral face is transparent or translucent, while the bottom face 14, in which the sensor spot 13 is normally contained, is impermeable to light. The side face 22 is the circumferential face of the cylindrical removable cap. The side face 22 can be arbitrarily divided so that a different sensor spot face 3 can be irradiated and measured by a rotation of the adapter, cap, mirror, prism or light guide. In this way, at least two sensor parameters can be measured with the same sensor and the same removable cap as a result of the conversion. Of course, however, the measurement of a single sensor parameter is also not excluded. The measurement at the 90° angle to the optical waveguide 17 is also advantageous in the case of a measurement parameter since measurement is thus also possible in measuring media having gas bubbles since no bubbles remain laterally on the vessel wall.

The problem of this application is briefly discussed again. Direct binding of the light guide 17 to a vessel wall is not possible since the losses would be too large so that ultimately too little signal arrives at the photodiode to allow a stable measurement. Fiber bundles allow measurement without large losses of energy. However, the fiber bundles cannot be bent arbitrarily in a very narrow space without breaking. A 90° curvature of the optical waveguide fiber bundle on a lateral face of a removable cap 3 is therefore not considered.

In general, many different geometries are conceivable. For example, the sensor 1 and the cap 3 have an outer diameter of 12 mm. In principle, however, larger geometries are also possible, for example 40 mm. The contours of the removable cap 3 are hygienically, flush sealed by a stainless steel framework structure and do not allow gaps. The latter would falsify measured values. Metallic parts from the interior of the cap 3 are painted dark black as metallic ferrules of the light guide 17 in order to avoid false measurements due to stray light.

Suitable materials for the base body of the cap 3 are in principle all light-permeable and temperature- and moisture-stable materials.

The term "temperature-stable" is to be understood here as: 60° C. and stable for 4 years; 121° C. and autoclave-stable for 30 min and at least 30 cycles; or 140° C. and autoclave-stable for 30 min and at least 30 cycles.

As already mentioned, at least a part of the circumferential face 22 of the sensor cap 3 must consist of a transparent or translucent material; the front side 12 consists of a non-transparent material or of a transparent material which is colored on the inside. Thus, a one-piece shape of the cap 3 is possible. For better cleanability for hygienic requirements or for greater mechanical stability, an overlaid stainless steel sleeve can surround the cap which is optically permeable on the sides. The material transitions here terminate hygienically flush. Suitable materials for the base body are glass ceramic, quartz glass, borosilicate glass, sapphire, sterilizable, preferably non-fluorescent plastics or hybrid materials (inorganic/organic) (e.g., polycarbonate, cyclic olefin copolymer (e.g., TOPAS®), polysulfones, poly(n-methyl methacrylimides), ethylene norbornene copolymers, polysulfones, poly(n methyl methacrylimides).

The sensor spot 13 is briefly discussed again. The sensitive layer consists of a flexible and the actual sensor spot 3. Suitable thin carriers are materials such as glass (Schott, Dow Corning), PET (polyethylene terephthalate), PEN (polyethylene naphthalate), cyclic olefin copolymer (e.g., TOPAS®), polycarbonate, ethylene norbornene copolymers, polysulfones, poly(n-methyl methacrylimides). However, activated or non-activated thin plastic films made of, for example, fluorinated polymers, such as PVDF (polyvinylidene difluoride) or ETFE (ethylene tetrafluoroethylene), are also conceivable.

All corrosion-insensitive materials, such as stainless steel, Hastelloy®, titanium, are possible as materials for the optional surrounding unit.

In order to apply the sensor spot 13 to the cap 3, all techniques known to the person skilled in the art, such as knife coating, spray coating, dip coating, printing, spin coating, etc. are considered as coating techniques.

A mixture of a pigment mixture and an RTV silicone, such as E41, and a solvent is prepared by spray coating on a, for example 50 µm thick, polycarbonate film and then coated with a carbon black-silicone mixture. The film is left to cure for a few days, for example at room temperature, for curing. A part of the film is covered with a mask in this case. This step is repeated with, for example, three other pigments. The selection of the matrices can differ here since water-permeable materials, such as hydroethylcellulose or polyurethanes, are used in the case of ionic sensors. In optical sensors, such as the optical measurement of pH or $CO_2$, reflective components are partially also added in order to amplify the intensity of the signal. This results in a film with four separate strips, which ideally terminate flush so that no extraneous light can enter. A possible crosstalk is prevented by an accurate positioning of the measuring beam.

In order to fasten the spot 3 as a film, it is cut to the suitable size with a laser, wound around the base body and fixed and combined with the base body via ultrasonic welding. Optionally, the transparent fusion site is coated. Alternatively, a film can also be fastened to the base body by gluing with a silicone or melting or shrinking. Likewise, at least one sensitive layer can be coated onto a film by spray coating, knife coating, spin coating, printing or the like. Alternatively, a coated film is glued, plugged, ultrasonically welded, soldered or melted on the transparent side of the cap in a receptacle. Alternatively, it is inserted via a metal sleeve with a window. In this way, a plurality of even different materials can be connected to one another.

In the assembled state (cap 3 on the sensor 1), the deflection module 14 is always located in the cap 3.

In the embodiments in FIGS. 2 and 5, the deflection module 14 is also located in the cap 3 in the disassembled state.

In FIG. 2, the deflection module 14, as mentioned, for instance, a mirror or a prism, is mounted directly in the cap. In this case, the deflection module 14 is rotated into the desired position into the bottom 12 of the removable cap 3. The bottom 12 can be rotated into the desired measuring position by rotating. By means of orientation feature 23, for instance a tongue-and-groove connection, it is possible to rotate only in one direction at 90° angles. The measuring position is clearly indicated on the bottom 12 of the cap 3. The cap 3 only must be screwed onto the sensor 1, for instance by means of the threads 20, 21, and the measurement can take place.

In the embodiment in FIG. 4, the cap 3 with the built-in deflection module 14 is placed onto the sensor 1 in a defined position and is positioned on the sensor 1 with a sleeve nut 24. Position information is indicated on the cap 3 and the sleeve nut 24. Optionally, the sleeve nut 24 and the cap 3 also include orientation means.

FIG. 5 shows an embodiment with an adapter 15 to the cap 3. The deflection module 14 is anchored with the adapter 15. Due to defined grooves, the adapter 15 can only be inserted into specific installation positions. The cap 3 is then fastened to the sensor with a sleeve nut 24 so that no further change in position can take place. A normal sensor thread is also possible here. The positions for measuring the parameters are attached to the adapter 15 or the cap 3.

FIG. 3 shows an embodiment. An adapter 16 for the light guide 17 is used in this case. The adapter 16 with the deflection module 14 is, for instance, a glass body with an incline which is placed onto the light guide 17. Said adapter is mounted in a clear position on the light guide so that analyte faces can be irradiated in a targeted manner. It is possible to produce an optical waveguide with an incline.

The base body can be inserted into and fastened in a stainless steel sleeve by pressing and screwing. However, other fastening techniques, such as soldering with glass paste or a metal alloy, adhesive bonding or shrinking are also conceivable.

The following possibilities for mounting the sensor 1 on the cap 3 and a change in the light beam direction by changing the position of the deflection module 14 are possible: rotation of deflection module in cap, rotation of light guide adapter, rotation of cap with sleeve nut, and rotation of adapter with deflection module in cap with sleeve nut.

As mentioned, various parameters can be measured with a cap 3. For this purpose, the removable cap 3 can be modified in such a way that the excitation radiation irradiates certain clearly defined regions of the interior of the cap, in each case onto another spot 13, in a defined direction. In this case, the change in position is so unambiguous that no transition regions can be irradiated. One possibility here is what is known as snap rotation, in which the mirror can always be rotated only by a certain angle, for example 90° in the case of four measurement parameters. In this case, the rotation can only take place unambiguously in one direction and by a certain angle of rotation. Intermediate angles are not possible, see FIGS. 6a-6e in this respect.

The preferred measuring position can be recognized by fixed markings on the cap 3 or on the deflection module 14. An inadvertent measurement of an incorrect parameter can thus be prevented. In some measurements, the measurement of different analytes with the same modulation frequency is possible and an erroneous measurement would possibly not immediately be noticed. Ideally, different parameters (e.g., oxygen and optical pH) can be measured with the same excitation LED, the same photodiode and the same filters. However, a change in the modulation frequency is also possible. The installation of a variable LED with different excitation wavelengths is possible, provided that the emitted light passes through the filter for the photodiode and can be detected.

FIGS. 7a-7b, 8a-8d and 9a-9d show various embodiments according to the present disclosure. The deflection module 14 can be activated in this case. This is done by external excitation. Possible external excitation takes place by applying voltage, light, gas, temperature, current, or by means of magnetic excitation or by combinations thereof. This results in a change in position of the deflection module, as a result of which the excitation radiation is deflected by 90°. Suitable materials are applied to geometries which are coated with the following layer. These can also be multilayer systems.

In the case of electrochromic layers, the switching takes place in the form of a darkening (blue coloring) by electric current with a currentless final state.

In the case of photochromic layers, the switching takes place in the form of a darkening by irradiation.

In photoelectrochromic layers, the switching takes place by solar radiation-activated electrochromic switching In the case of thermochromic layers or thermotropic layers, the switching takes place in the form of a color change or a white clouding when a threshold temperature is exceeded.

In polymer-dispersed liquid crystal systems, the switching takes place in the form of a clearing by orienting light-scattering liquid crystals upon application of an electrical voltage.

In the case of suspended particle devices, the switching takes place in the form of a clearing by orienting optically anisotropic absorbing particles upon application of a voltage.

Switching is also possible by means of switchable metal hydride-based mirrors, by means of a gasochromic layer or by means of one or more optically switchable transistors.

FIGS. 7a-7b show different switching states of the sensor 1 and switchable reflective mirrors. In FIG. 7a, the right side is mirror-active; in FIG. 7b, the left side is mirror-active. The deflection module 14, in FIGS. 7a-7b in the form of a pyramid, is switched by means of voltage source 25. The transparent face 26 and the reflective face 27 are each marked or hatched.

FIGS. 8a-8d show embodiments for switching the deflection module 14 with switchable transparent or non-transparent faces in the sensor cap 3. Only one section with the light guide 17 which transmits or receives transmitted or received radiation is shown in each case.

In FIG. 8a, a mirror is superposed by a switchable substance which, depending on the switching position, is, at least for certain light, impermeable but absorbing and optically transparent, or wherein the optical layer is reflective (reference sign 27) and transparent (reference sign 26) depending on the switching.

In FIG. 8b and FIG. 8c, the inner face of the sensor cap 3 is equipped with a switchable layer. The reflecting layer is likewise switchable (FIG. 8b) or not switchable (FIG. 8c).

In FIG. 8d, the sensor spot 13 is a carrier which is coated on the rear side and which consists of a switchable film 30 and is welded, for example, to a plastic cap made of polycarbonate and which can let light through or absorb it. This embodiment comprises a non-transparent spot face 28 and a transparent inner face 29 of the cap 3.

As mentioned, the sensor 1 is used for multi-parameter measurements. For this purpose, the sensor cap can be modified in such a way that the sensor beam irradiates certain clearly defined regions of the interior of the cap in a defined direction. In this case, the change in position is so unambiguous that no transition regions can be irradiated. One possibility here is an unambiguous polyhedron structure in which the light beam always only occurs around a specific exposed reflection face and, by switching the exposed face, the irradiated face can be rotated, for example offset by 90° in the case of four measurement parameters (for example, in the pyramid structure). In this case, the free reflection face can be uncovered and the sensitive layer 13 can be irradiated only unambiguously in one direction and by a certain angle of rotation. This is predetermined by the geometry of the beam body and its installation position. Intermediate angles are not possible.

FIGS. 9a-9d show polyhedron structures or wider-area structures, such as a triangular prism (FIG. 9a), a cone (FIG. 9b), pyramids (FIG. 9c), or a "house roof with gable brought forward" (FIG. 9d) or "gabled roof."

The upper roof face is covered here in each case with a switchable mirror layer (transition: transparent-reflective) or an electrochromic layer (transition light impermeable-transparent), see above. The angle of the reflective face or of the face which exposes the reflective face (insofar as it is attached directly to the surface) is arranged at an angle of 45° to the sensor cap bottom face or to the perpendicular of the optical waveguide.

A different number of switchable faces is possible in each case: three in the case of the triangular prism, n in the case of the cone, four in the case of pyramids, four in the case of the "house roof with gable brought forward" or two in the case of the "gabled roof." One optical measurement of a physical or chemical measurand can take place per face. The reflective faces can be triangles, trapezoids or rectangles. In the case of the cone, which is a round face, the positioning cannot be predetermined via the geometric face of the reflection body but rather only via the defined exposure or activation of a reflection face. The size of the reflection face, for example the opening gap, is thus determined by the pixilation or raster of the corresponding reflection or covering layer on the light-diffractive face and/or on the base face on which the sensitive layer is applied.

With a symmetrical construction, a preferred installation position of the reflective unit is not necessary since the correct position is achieved automatically during normal cap assembly. In the other embodiments, however, preferred directions are provided which are achieved by means of orientation feature 23, see above, since incorrect assembly would lead to incorrect measured values.

The preferred measuring position can be recognized by fixed markings on the cap 3 or the adapter. An inadvertent measurement of an incorrect parameter can thus be prevented. In some measurements, the measurement of different analytes with the same modulation frequency is possible and an erroneous measurement would possibly not immediately be noticed. Ideally, different parameters (e.g., oxygen and optical pH) can be measured with the same excitation LED, the same photodiode and the same filters. However, a change in the modulation frequency is also possible. The installation of a variable LED with different excitation wavelengths is possible, provided that the emitted light passes through the filter for the photodiode and can be detected.

The invention claimed is:

1. An optochemical sensor for determining a measurand correlated with a concentration of an analyte in a measuring fluid, comprising:
   a housing having an immersion region adapted to be immersed into the measuring fluid;
   a removable cap removably arranged at the immersion region of the housing, the removable cap including at least one sensor spot disposed on a lateral face of the removable cap;
   a radiation source disposed in the housing and configured to emit excitation radiation into the removable cap in an axial direction toward an end face of the removable cap, wherein the end face is perpendicular to the lateral face;
   a deflection module disposed in the removable cap and configured to deflect the excitation radiation in a direction of the at least one sensor spot such that the at least one sensor spot is irradiated with the excitation radiation, wherein the direction of the at least one sensor spot is perpendicular to the axial direction;
   a radiation receiver disposed in the housing and configured to receive received radiation emitted by the at least one sensor spot; and a sensor circuit disposed in the housing and configured to control the radiation source, to receive signals of the radiation receiver, and to generate and output output signals based on the signals of the radiation receiver.

2. The optochemical sensor of claim 1, wherein the deflection module comprises a mirror, a prism or a beveled glass rod.

3. The optochemical sensor of claim 1, wherein the deflection module is arranged in an adapter.

4. The optochemical sensor of claim 3, wherein the sensor further comprises a light guide which conducts the excitation radiation from the radiation source in the axial direction toward the removable cap, wherein the adapter is configured to adapt to the light guide.

5. The optochemical sensor of claim 1, wherein the housing and the removeable cap are cylindrical, wherein the lateral face of the removable cap is a circumferential face of the removable cap, and wherein the at least one sensor spot is disposed on the circumferential face of the removable cap, which includes a region translucent or transparent at least to the excitation radiation and the received radiation.

6. The optochemical sensor of claim 1, wherein the removable cap comprises a gas ceramic, glass, borosilicate glass, quartz glass, sapphire, a transparent or translucent plastic of the series polycarbonate, cyclic olefin copolymer, polysulfones, poly(n-methyl methacrylimides), ethylene norbornene copolymers or a hybrid of stainless steel and these materials.

7. The optochemical sensor of claim 1, wherein the at least one sensor spot of the removable cap comprises at least two sensor spots, each disposed in a separate area of the lateral face of the removable cap, wherein the removable cap is configured to enable each of the at least two sensor spots to be selectively, individually oriented relative to the deflection module as to selectively, individually irradiated a selected sensor spot of the at least two sensor spots with the excitation radiation.

8. The optochemical sensor of claim 1, wherein the sensor comprises an orientation feature configured to enable a set orientation of the at least one sensor spot relative to the deflection module.

9. The optochemical sensor of claim 8, wherein the orientation feature comprises a tongue-and-groove connection, wherein the removable cap includes either a tongue or a groove of the tongue-and-groove connection, and the housing includes either a complementary groove or complementary tongue, respectively.

10. The optochemical sensor of claim 1, wherein the housing comprises a threaded portion and the removable cap comprises a corresponding counter-thread portion.

11. The optochemical sensor of claim 1, wherein the deflection module is configured as a polyhedron or cone.

12. The optochemical sensor of claim 1, wherein the deflection module comprises a mirror configured to be selectively activated from reflective to transparent.

13. The optochemical sensor of claim 1, wherein the sensor circuit is configured to generate the output signals based on an intensity, a phase shift or a decay time of the signals of the radiation receiver.

14. The optochemical sensor of claim 8, wherein the orientation feature comprises a detent, wherein the removable cap and the housing each comprise a complementary feature of the detent, respectively.

15. The optochemical sensor of claim 1, wherein the deflection module includes a—reflective polyhedron including a face configured to be selectively switched from reflective to transparent.

* * * * *